July 14, 1936.  A. G. JENSEN  2,047,782

ELECTRICAL MEASURING SYSTEM

Filed May 14, 1935  3 Sheets-Sheet 1

INVENTOR
A. G. JENSEN
BY
Ralph P. Holcomb
ATTORNEY

July 14, 1936.  A. G. JENSEN  2,047,782
ELECTRICAL MEASURING SYSTEM
Filed May 14, 1935  3 Sheets-Sheet 2

INVENTOR
A. G. JENSEN
BY
Ralph T. Holcomb
ATTORNEY

July 14, 1936.                A. G. JENSEN                2,047,782
ELECTRICAL MEASURING SYSTEM
Filed May 14, 1935            3 Sheets-Sheet 3
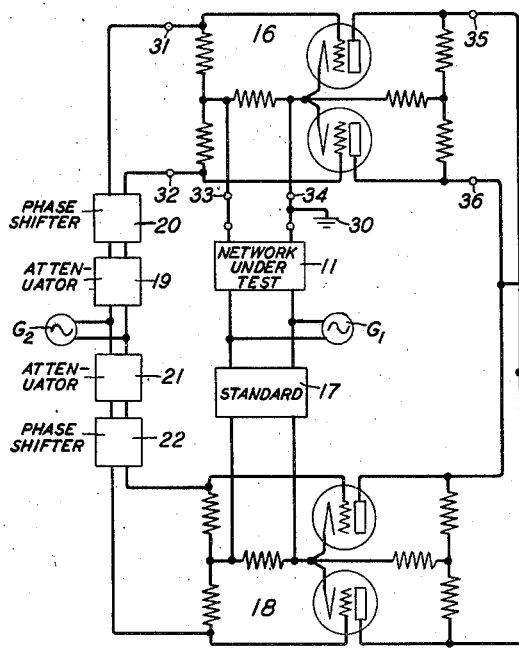
FIG. 6
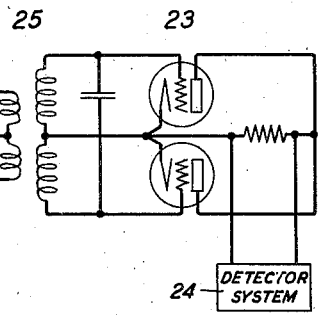
FIG. 7
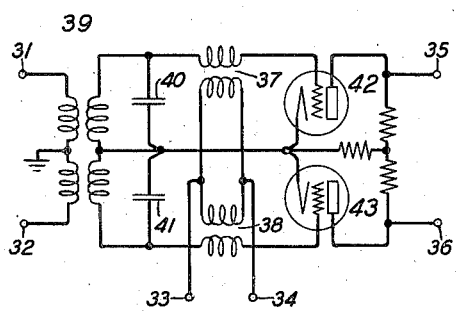
FIG. 8
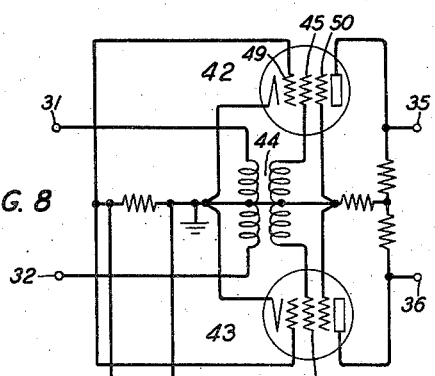
FIG. 9
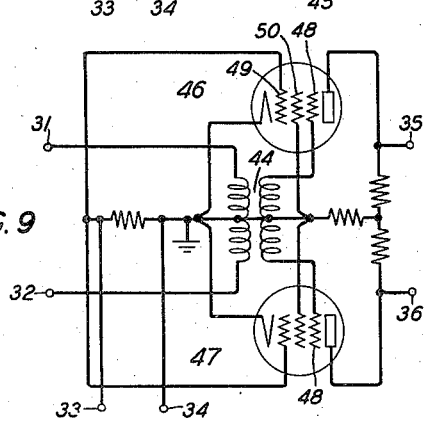
INVENTOR
A. G. JENSEN
BY
Ralph T. Holcomb
ATTORNEY Patented July 14, 1936

2,047,782

UNITED STATES PATENT OFFICE 2,047,782

ELECTRICAL MEASURING SYSTEM

Axel G. Jensen, South Orange, N. J., assignor to Bell Telephone Laboratories, Incorporated, New York, N. Y., a corporation of New York Application May 14, 1935, Serial No. 21,414

17 Claims. (Cl. 179—175.3)

This invention relates to electrical measuring systems, and more particularly to such a system adapted to measure transmission characteristics at high frequencies.

An object of the invention is to determine the transmission characteristics of electrical apparatus.

Another object is to determine the phase difference between two alternating currents.

Another object is to increase the accuracy with which measurements of transmission loss and phase shift may be made.

A further object is to simplify the making of such measurements.

A feature of the invention is an electrical testing circuit in which the effects of frequency drift in the signal generator are eliminated.

In electrical communication systems there is often encountered the problem of ascertaining the transmission characteristics of the component apparatus comprising the system. Heretofore difficulty has been encountered in making such measurements at high frequencies because of the inaccuracies resulting from the frequency drift in the signal generator.

In accordance with the present invention there is provided a method of and apparatus for making transmission measurements at high frequencies both accurately and in a simple manner. The method is particularly adapted for measuring phase shift and transmission loss. Transmission loss is used herein in a generic sense to include either loss or gain. A null method is employed and the test circuit is so arranged that the effects of drift in the testing frequency are eliminated.

One specific embodiment of the invention makes use of two oscillators and three modulators. A portion of the signal current from the first oscillator is fed through the apparatus under test to the first modulator, and another portion is fed through a standard network or directly to the second modulator. The beating current for both of these modulators is obtained from the second oscillator, which has a low frequency compared to that of the signal, and is passed through variable attenuators and phase shifters before it reaches the modulators. The output of these two modulators is combined at the input of a third modulator. From the output of this third modulator there is selected and detected a frequency which is a harmonic of the second oscillator. In a modified form of the invention the network under test is connected into circuit after, instead of before, the first modulator.

In the operation of the system, the attenuators and phase shifters are adjusted until the detected current becomes zero. The transmission loss and phase shift introduced by the apparatus under test are then found directly from the settings of the attenuators and phase shifters. It will thus be seen that a drift in the frequency of the testing current will not affect the accuracy of the measurements, since only current of a comparatively low frequency passes through the variable attenuators and phase shifters, and a harmonic of this frequency is the one which is detected. In this way a simple and accurate method is provided for measuring the transmission characteristics of apparatus at high frequencies.

The nature of the invention will be more fully understood from the following detailed description and by reference to the accompanying drawings of which:

Figs. 5 and 6 show measuring systems using balanced modulators of the conjugate input type; and—

Figs. 7, 8 and 9 show in more detail modulators of the conjugate input type suitable for use in the measuring circuits of Figs. 5 and 6.

Figure 1:
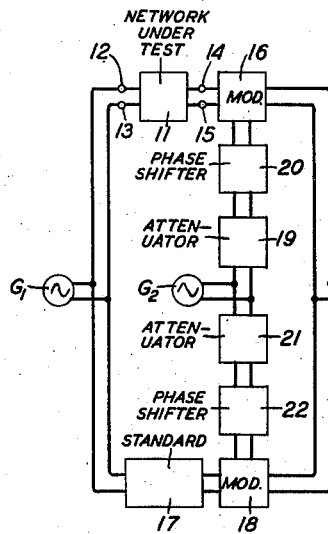
Fig. 1 is a schematic diagram showing an embodiment of the invention in a measuring circuit in which the apparatus under test is connected into circuit ahead of the first modulator.

In the embodiment of the invention shown in Fig. 1, two oscillation generators and three modulators are employed, the network 11 under test being connected into the circuit ahead of the first modulator by means of the four terminals 12, 13, 14 and 15. The testing current is supplied by the generator $G_1$, the output of which is split into two portions, one of which passes through the apparatus 11 under test to the modulator 16 while the other portion passes through a standard network 17 to the modulator 18. These two modulators are supplied with a beating current from the same generator $G_2$ which has a low frequency compared to that of the generator $G_1$. A variable attenuator 19 and a variable phase shifter 20 are interposed between the generator $G_2$ and the modulator 16, and a second variable attenuator 21 and a second variable phase shifter 22 are inserted in the circuit between $G_2$ and the modulator 18. The output currents from the modulators 16 and 18 are combined in the modulator 23 in which all of the undesired modulation products are balanced out leaving only those which are second harmonics of the frequency supplied by the generator $G_2$. This second harmonic is detected in the detector system 24 which may, if required, include an amplifier and a selective network for suppressing all frequencies except the second harmonic. The standard network 17 introduces a known amount of attenuation and phase shift. Its function is to extend the range covered by the measuring system, and in some instances it may be omitted entirely.

The method of making a measurement with the testing circuit shown in Fig. 1 consists in adjusting the variable attenuators and variable phase shifters until no current is detected in the detector system 24. Under these conditions the difference between the phase shift introduced by the standard and the phase shift introduced by the network under test is equal to 180 degrees plus or minus the difference between the settings of the two variable phase shifters. Likewise, the difference between the insertion loss introduced by the standard network and the insertion loss introduced by the network under test is equal to the difference between the readings of the two variable attenuators.

The theory of operation of the measuring system shown in Fig. 1 will now be considered. The signal current furnished by the generator $G_1$ has a frequency $f_1$ and the beating current furnished by the generator $G_2$ has a frequency $f_2$, which is small compared with the frequency $f_1$. It is assumed that the outputs from the generators $G_1$ and $G_2$ are purified of disturbing harmonics, if necessary. In the present discussion, it is also assumed that the modulators $M_1$ and $M_2$ are perfectly balanced, but, as pointed out hereinafter, accurate measurements may be obtained even though this condition is not completely fulfilled. The modulators may, for example, be of the common input type or of the conjugate input type. The output currents from the modulators 16 and 18 will principally consist of the frequencies $f_1$, $f_2$, $(f_1+f_2)$ and $(f_1-f_2)$. In the present arrangement, however, the frequency $f_1$ is suppressed by properly balancing the modulators 16 and 18 while the frequency $f_2$ is effectively suppressed by the selective circuit located at the input of the modulator 23 as described hereinafter. All higher order modulation products are either balanced out or kept negligibly low by proper operation of the modulators. The outputs of the modulators 16 and 18 are combined at the input of the modulator 23 and the output of this modulator 23 will contain, among other low frequency components, current of the frequency $2f_2$. By analyzing the two inputs to the modulator 23 each consisting of the three frequencies $f_1$, $(f_1-f_2)$ and $(f_1+f_2)$, it is found that the output of frequency $2f_2$ is balanced out when the relative amplitude and phase shift of the two inputs are adjusted so as to make either $(f_1-f_2)$ or $(f_1+f_2)$ from the modulator 16 equal in magnitude and opposite in phase to the same frequency output of the modulator 18. It is thus found that there are two conditions under which a balance may be obtained.

The output of frequency $2f_2$ is entirely independent of any slight drift in the frequency of the signal generator $G_1$ since it is obtained simply as a second harmonic of the low frequency beat generator $G_2$. Another advantage of the circuit is that the variable phase shifters and variable attenuators are inserted directly in the output of the beating generator $G_2$ and thus are not subjected to any frequency change at all since this generator is operated at a frequency sufficiently low to insure stability of operation.

Figure 2:
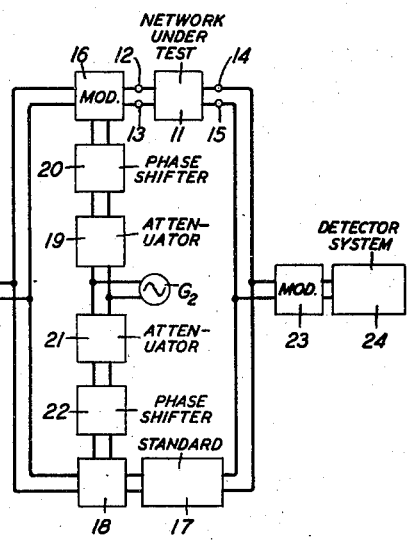
Fig. 2 represents diagrammatically a modified form of the invention in which the apparatus under test is connected into circuit after the first modulator.

In some cases it may be found of advantage to insert the network 11 under test and the standard network 17 after the first stage of modulation as is shown in Fig. 2. This method gives the same results as the one described above in connection with Fig. 1 provided that the network under test offers the same phase shift and attenuation to both of the sidebands $(f_1+f_2)$ and $(f_1-f_2)$. Since the frequency $f_2$ is chosen to be low compared to the frequency $f_1$ this will be substantially true in most cases.

Figure 3:
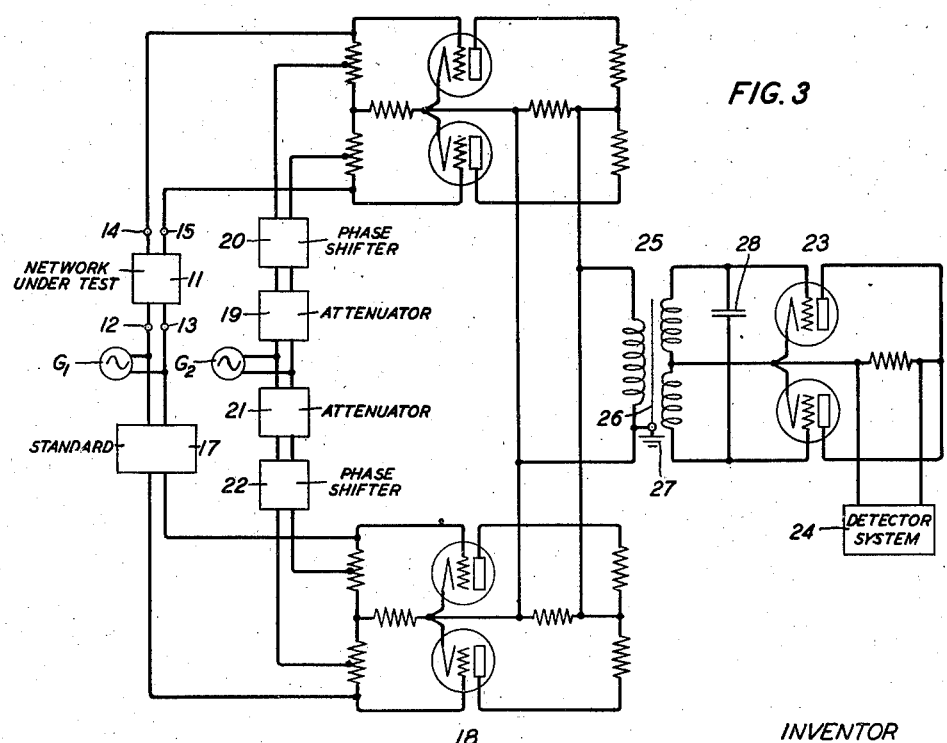
Figs. 3 and 4 show measuring circuits in accordance with the invention in which balanced modulators of the common input type are employed.

Fig. 3 shows a measuring circuit in accordance with Fig. 1 in which the modulators 16 and 18 are indicated diagrammatically as of the common input type and are of balanced construction. For the sake of simplicity in Fig. 3, as well as in the other figures which follow, the sources of electromotive force are omitted. The modulators 16, 18 and 23 are of standard construction and employ voltages of the magnitude usually used in modulators of this type. In the system shown in Fig. 3 the network under test is inserted in the circuit ahead of the modulator 16 and the system is particularly suitable for making measurements on a network of the balanced type. At the input to modulator 23 is located a transformer 25 having a shield 26 between the primary and secondary windings connected to the grounded side of the primary. The shield may be grounded as shown at 27, either directly or through a by-pass condenser. The secondary of the transformer 25 is tuned by means of the condenser 28 to the frequency $f_1$ while effectively suppressing the frequency $f_2$ and all other low frequencies.

Figure 4:
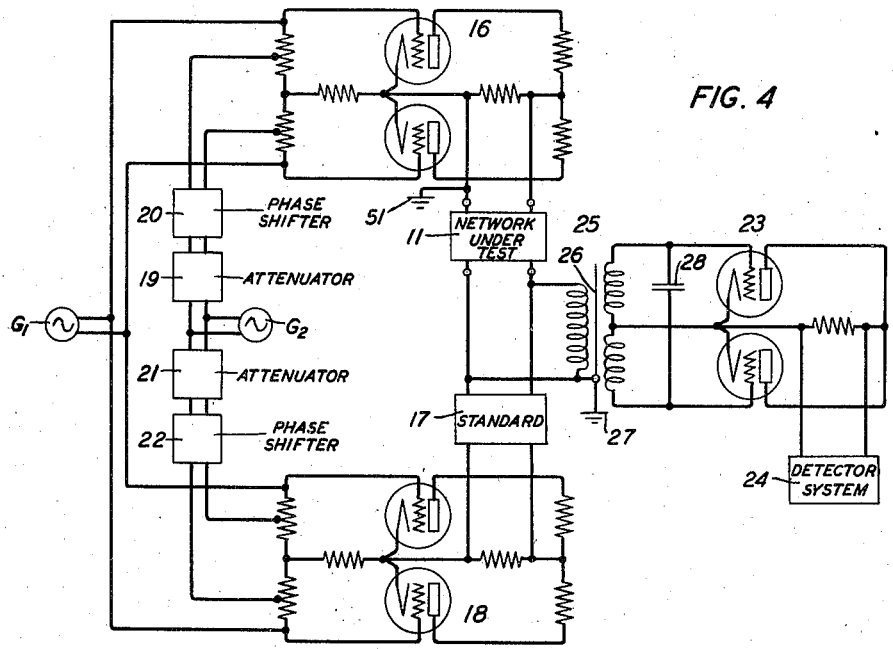

Fig. 4 shows how the system of Fig. 3 may be modified when it is desired to make measurements on networks of the unbalanced type. In Fig. 4 the network 11 under test and the standard network 17 are located respectively after the modulators 16 and 18. The grounded side of the network under test may be connected to ground as shown at 51. In other respects the measuring circuit shown in Fig. 4 is the same as the one described above in connection with Fig. 3.

Figure 5:
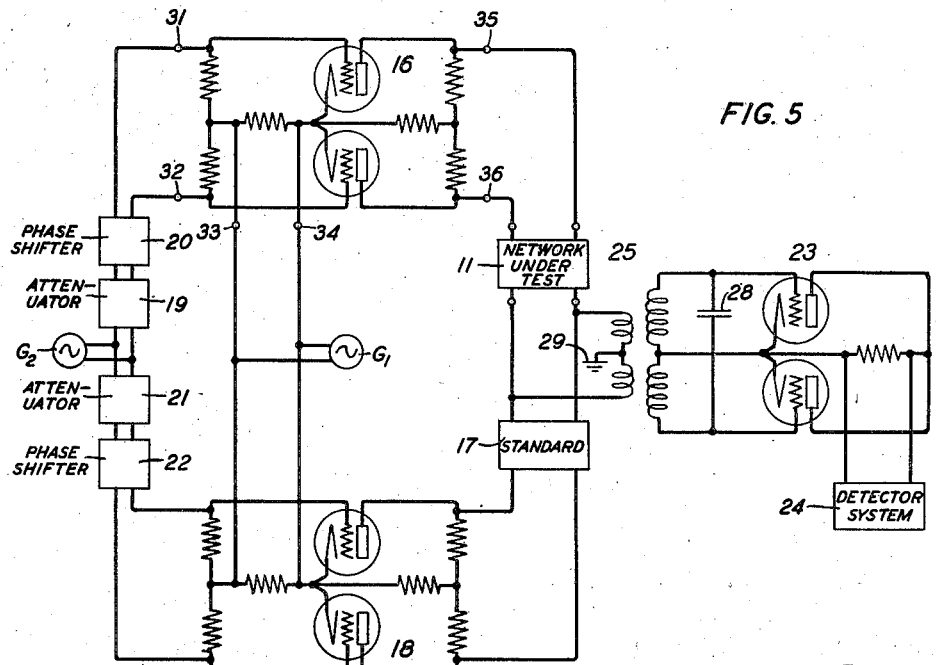

Fig. 5 shows a modification of the invention in accordance with Fig. 2 using modulators of the conjugate input type in which the signal frequency $f_1$ is impressed upon the midbranch. The system shown in Fig. 5 is particularly suitable for making measurements on balanced networks. In this circuit the primary of the transformer 25 is grounded at the midpoint as shown at 29, either directly or through a by-pass condenser. In other respects the circuit is similar to those described above in connection with Figs. 3 and 4.

Fig. 6 shows how the measuring circuit of Fig. 5 may be modified when it is desired to make measurements on unbalanced networks. The network under test 11 and the standard network 17 are connected into the circuit between the signal generator $G_1$ and modulators 16 and 18 respectively. The grounded side of the network under test may be connected to ground as shown at 30. In this figure the midpoint of the primary winding of transformer 25 is grounded as shown at 29 through a by-pass condenser 45.

Fig. 7 shows in more detail a possible input arrangement which may be used for the modulators 16 and 18 of Figs. 5 and 6. In Fig. 7 the terminals 31, 32, 33, 34, 35 and 36 correspond to the like numbered terminals shown in Figs. 5 and 6. As shown in Fig. 7 current of frequency $f_1$ from the generator $G_1$ is impressed upon the modulator by means of the pair of transformers 37 and 38, the primary windings of which are connected in parallel as shown. Current from the beating oscillator $G_2$ is impressed upon the modulator by means of the transformer 39, the secondary of which is divided and tuned by means of the condensers 40 and 41.

Other circuit arrangements suitable for the modulators 16 and 18 of Figs. 5 and 6 are shown in Figs. 8 and 9, in which pentodes are used. In Fig. 8 two space charge pentodes 42 and 43 are employed with the low frequency applied through the balanced transformer 44 to the space charge grids 45. Fig. 9 is similar to Fig. 8 except that two power pentodes 46 and 47 are used, the low frequency being applied to the suppressor grids 48. In Figs. 8 and 9 the reference numeral 49 indicates the control grid, and 50 the screen grid.

Even though the modulators 16 and 18 have slight inequalities and the two halves of the measuring circuit have slight amplitude and phase unbalances, a correct result may be obtained by taking the average of two measurements, one of which is made after interchanging the leads from the networks 11 and 17 to the modulators 16 and 18. Another way of obtaining the correct answer is to make a separate measurement with the unknown network and the standard network removed and to apply this zero correction to the measurement obtained with the networks connected into the circuit.

What is claimed is:

1. A method of determining the phase difference between two alternating currents which consists in separately combining said two currents with separate portions of a third current to produce resultant waves, combining said resultant waves to produce a harmonic of said third current, and adjusting the phase difference between the separate portions of said third current until said harmonic disappears.

2. A method of determining the phase difference between two alternating currents which consists in separately combining said two currents with separate portions of a third current to produce resultant waves, combining said resultant waves to produce the second harmonic of said third current, and adjusting the phase difference between the separate portions of said third current until said harmonic disappears.

3. The method of determining the phase difference between two vibrations of the same frequency which consists in producing beats between each of said vibrations and separate portions of a third vibration, combining said beats to produce a vibration which is a harmonic of said third vibration, and adjusting the phase difference between the separate portions of said third vibration until said harmonic disappears.

4. The method of determining the phase difference between two alternating currents of the same frequency which consists in heterodyning each current with a third current of low frequency compared to said first-mentioned currents, combining the trains of beat frequencies thus produced, detecting a harmonic frequency of said third current, and adjusting the phase of said third current until said harmonic frequency disappears.

5. The method of determining the phase and amplitude differences between two alternating currents of the same frequency which consists in heterodyning each of said currents with separate portions of a third current the phase difference and relative amplitudes of which may be adjusted, combining the two resultant trains of beats to produce a harmonic frequency of said third current, and adjusting the phase difference and relative amplitudes of the separate portions of said third current until said harmonic frequency is balanced out.

6. A method of determining the phase and amplitude differences between two alternating currents which consists in separately combining said two currents with separate portions of a third current to produce resultant waves, combining said resultant waves to produce a harmonic of said third current, and adjusting the phase difference and relative amplitudes of the separate portions of said third current until said harmonic is eliminated.

7. A method of measuring the phase shift in electrical apparatus which consists in generating a testing current, dividing said current into two portions, sending one of said portions through said apparatus, separately modulating said two portions of current with separate portions of a third current, combining the resultant waves to produce a harmonic of said third current, and adjusting the phase difference between the separate portions of said third current until said harmonic disappears.

8. A method of measuring the phase shift and insertion loss introduced by electrical apparatus which consists in generating a testing current, dividing said current into two portions, separately modulating said two portions of current with separate portions of a beating current to produce resultant trains of beat, passing one of said trains of beats through said apparatus, combining said resultant trains of beats to produce a harmonic of said beating current, and adjusting the phase difference and relative amplitudes of the separate portions of said beating current until said harmonic is eliminated.

9. A method of measuring the phase shift and insertion loss introduced by electrical apparatus which consists in generating a testing current, dividing said current into two portions, passing one of said portions through said apparatus, separately modulating said two portions of current with separate portions of a beating current to produce resultant trains of beats, combining said resultant trains of beats to produce a harmonic of said beating current, and adjusting the phase difference and relative amplitudes of the separate portions of said beating current until said harmonic is eliminated.

10. A system for measuring the phase difference between two alternating currents comprising two modulators, means for supplying said two currents to each of said modulators, a source of beating current, means for supplying separate portions of said beating current to each of said modulators, means for varying the phase difference between the separate portions of said beating current, means for combining the outputs of said two modulators to produce a harmonic of said beating current, and means for detecting said harmonic.

11. A system for measuring the phase difference between two alternating currents comprising two modulators, means for applying said two currents to each of said modulators, a source of beating current, means for supplying separate portions of said beating current to each of said modulators, means for varying the phase difference between the separate portions of said beating current, means for combining the outputs of said two modulators to produce the second harmonic of said beating current, and means for detecting said second harmonic.

12. A system for determining the phase and amplitude difference between two alternating currents comprising a source of low frequency current, means for separately combining said low frequency current with each of said first-mentioned currents to produce beats, means for combining said beats to produce a harmonic of said low frequency current, and means for varying the phase and amplitude of said low frequency current.

13. A system for determining the phase and amplitude differences between two alternating currents of the same frequency comprising two modulators, means for supplying said two currents separately to said modulators, a source of heterodyne waves, means for varying the phase and amplitude of said heterodyne waves, means for supplying said heterodyne waves to said modulators, a third modulator, means for supplying the output currents from said two modulators to said third modulator, and means for detecting a harmonic frequency of said heterodyne waves.

14. A system for determining the phase shift in electrical apparatus comprising a source of testing current, means for sending a portion of said current through said apparatus under test, a source of beating current, means for combining a portion of said beating current with said portion of testing current to produce a train of beats, means for separately combining a second portion of said beating current with another portion of said testing current to produce a second train of beats, means for combining said two trains of beats to produce a harmonic of said beating current, and means for adjusting the phase difference between the two portions of said beating current.

15. A system for measuring the phase shift and attenuation of electrical apparatus comprising a source of testing current, two modulators, means for sending a portion of said testing current through said apparatus to one of said modulators, means for supplying another portion of said testing current to said second modulator, a source of beating current, means for supplying separate portions of said beating current to each of said modulators, means for combining the output currents from said two modulators to produce a harmonic of said beating current, and means for varying the phase difference and relative amplitudes of the separate portions of said beating current.

16. A system for measuring the phase shift and attenuation of electrical apparatus comprising a source of testing current, two modulators, means for supplying a portion of said testing current to one of said modulators, means for supplying a second portion of said testing current to said second modulator, a source of beating current, means for supplying separate portions of said beating current to each of said modulators, means for sending the output current from one of said modulators through said apparatus, means for combining the output currents from said two modulators to produce a harmonic of said beating current, and means for varying the phase difference and relative amplitudes of the separate portions of said beating current.

17. An electrical measuring system for determining the phase shift and insertion loss introduced by electrical apparatus comprising an oscillator, a second oscillator of low frequency compared to said first-mentioned oscillator, means for combining a portion of the output of said first oscillator with a portion of the output of said second oscillator to produce a train of beats, separate means for combining another portion of the output of said first oscillator with another portion of the output of said second oscillator to produce a second train of beats, a modulator, means for passing one of said trains of beats through said apparatus to the input of said modulator, means for supplying said second train of beats to the input of said modulator, means for detecting the output of said modulator, and means for varying the phase and amplitude of at least one of said portions of the output of said second oscillator.

AXEL G. JENSEN.